(12) United States Patent
Norman (10) Patent No.: US 8,625,428 B2
(45) Date of Patent: Jan. 7, 2014

(54) METHOD AND APPARATUS FOR HANDLING A SWITCH USING A PREFERRED DESTINATION LIST

(75) Inventor: Mårten Norman, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 450 days.

(21) Appl. No.: 12/995,868

(22) PCT Filed: Jun. 5, 2008

(86) PCT No.: PCT/SE2008/050671
§ 371 (c)(1),
(2), (4) Date: Dec. 2, 2010

(87) PCT Pub. No.: WO2009/148371
PCT Pub. Date: Dec. 10, 2009

(65) Prior Publication Data
US 2011/0075561 A1 Mar. 31, 2011

(51) Int. Cl.
*H04L 12/26* (2006.01)
(52) U.S. Cl.
USPC .......................................... 370/235
(58) Field of Classification Search
USPC ............... 370/352–356, 389, 392, 400, 401
See application file for complete search history.

(56) References Cited

U.S. PATENT DOCUMENTS

| 6,870,840 | B1 * | 3/2005 | Hill et al. ................. 370/389 |
| 7,023,837 | B1 * | 4/2006 | Srinivasan ............... 370/352 |
| 2003/0118035 | A1 | 6/2003 | Sharma et al. |
| 2008/0123561 | A1 | 5/2008 | Sharma et al. |

FOREIGN PATENT DOCUMENTS

| GB | 2 334 033 A | 5/2000 |
| WO | WO 01/67686 A1 | 9/2001 |

OTHER PUBLICATIONS

International Search Report for PCT/SE2008/050671 dated Feb. 11, 2009.
Chinese First Office Action Corresponding to Chinese Patent Application No. 200880129678.2; Issuing Date: Jan. 7, 2013; 3 Pages.

* cited by examiner

*Primary Examiner* — Chi Pham
*Assistant Examiner* — Fahmida Chowdhury
(74) *Attorney, Agent, or Firm* — Myers Bigel Sibley & Sajovec (57) ABSTRACT

The present invention relates to switching technology, such Ethernet, where data switching is performed based on a collision-prone switching table (31). The invention provides a possibility to avoid difficult collision-caused flooding and makes it possible to use simple and inexpensive switching equipment, while still not having to worry about consequences of collision-caused flooding. A preferred destination list (43) is provided. This list identifies one or more preferred switching destinations (1, 11). For each preferred destination, a switching address and a corresponding port identification is obtained (53). An order (55) is then made to enter and lock the obtained switching address and corresponding port identification into the switching table (31).

25 Claims, 5 Drawing Sheets

| preferred destination list | | |
|---|---|---|
| switching address | port ID | general description |
| MAC C | p3 | base band unit |

Fig. 5a

| preferred destination list | | |
|---|---|---|
| IP address | port ID | general description |
| IP C | p3 | base band unit |

Fig. 5b

| preferred destination list | | | |
|---|---|---|---|
| switching address | port ID | IP address | general description |
| MAC C | p3 | IP C | base band unit |

METHOD AND APPARATUS FOR HANDLING A SWITCH USING A PREFERRED DESTINATION LIST

CROSS REFERENCE TO RELATED APPLICATION

This application is a 35 U.S.C. §371 national stage application of PCT International Application No. PCT/SE2008/050671, filed on 5 Jun. 2008, the disclosure and content of which is incorporated by reference herein in its entirety. The above-referenced PCT International Application was published in the English language as International Publication No. WO 2009/148371 A1 on 10 Dec. 2009.

TECHNICAL FIELD

The present invention pertains to the field of switching, and more particularly to the part of this field where the switching is performed using a collision-prone switching table.

BACKGROUND

Traditionally, ATM (Asynchronous Transfer Mode) has often been used for data transport in many cellular communication networks, such as the 3GPP (Third Generation Partnership Project) standardized WCDMA (Wideband Code Division Multiple Access), but now IP (Internet Protocol) based transport is being introduced. Ethernet is one technology that often is used as a carrier for the IP packets. Ethernet is a packet transfer technology based on a 48-bit MAC (Media Access) address and supports networks ranging from two up to thousands or more nodes. Nodes of an Ethernet based network are normally connected in a tree, ring or hub structure using Ethernet switches. The Ethernet switch is a device that receives an Ethernet packet from one port, looks at the destination MAC address and forwards it to another port that will either reach the destination or another switch that can forward it to the destination. The Ethernet switch is self-learning. By looking at incoming packets, it learns that a source MAC address of the incoming packet is associated with an incoming port at which the incoming packet is received and stores the port/MAC address association in a switching table. The switching table is then used to switch incoming packets. A destination MAC address is searched for in the switching table, and the switch can see which port to forward the packet to. If the destination address is not found in the switching table, the switch is unable to know which port to forward to. This is solved by process known as flooding, i.e. sending the packet to all ports except the one it came from (the incoming port). Flooding is the same method as the deprecated ancestor "Ethernet hub" used. An Ethernet hub has design that is a lot simpler, but will waste capacity of the Ethernet network by flooding all packets to every destination. The introduction of the Ethernet switch improved the situation significantly by only sending packets to the intended destination/receiver instead of everyone on the whole Ethernet. But as indicated above, the switch is sometimes forced to waste capacity by flooding when it has not been able to learn an address.

Due to, for example, cost considerations, it is normally not possible to design the switching table so that it can learn every MAC address. The switching table is, therefore, often limited to a few thousand MAC addresses since a large RAM (Random Access Memory) will cost more, and most switches will not need more. Consequently, there cannot be a one-to-one mapping of the 48-bit MAC addresses to the positions in the switching table, since a table address, indicating a position in the switching table, will be just 10-20 bits for a reasonably sized RAM. Algorithms have been developed for searching the switching table for the right position. Furthermore, there is a need to verify that the position is valid (often by storing the valid MAC address at the position itself). Some of the more common algorithms for this switching table look-up are the following: content-addressable memory, which is fast but expensive (consumes a lot of RAM); searching, which is cheap but slow; and hashing or truncation of address, which is both fast and cheap.

Hashing and truncation look-up thus have some advantages. However, these techniques are also prone to collisions. That is, more than one MAC address may be mapped to the same position in the switching table. When two (or more) MAC addresses are allocated to the same position in the switching table, only one of the addresses can be stored in the switching table. Thus the Ethernet switch is only able to work as a switch for one of the addresses (the one that happens to be stored). Any other MAC address associated with the same position in the switching table will have to be handled by flooding. For various reasons, this behavior can normally be accepted in traditional IP/Ethernet datacom oriented networks. The probability for collision is fairly low for small networks (low number of MAC addresses). Furthermore, networks are often over-dimensioned. For example, most Ethernet LANs (Local Area Networks) have a significant overcapacity to each computer. Moreover, traffic is often bursty making problems temporary. It is also unlikely that two computers with colliding MAC addresses will transmit at the same time for extended periods of time. Soon after one of the computers is going idle, the switch will refresh the switching table and stop the flooding of the other computer. Additionally, should the flooding become a serious problem, the computer or an Ethernet board could be replaced. Due to this equipment change, the MAC address is changed, and the collision is gone and eventually written off as "No Fault Found", i.e. in most cases the problem is not even detected by the person solving it.

However, with the introduction of data transport using Ethernet switches in cellular and other telecom oriented networks, the difficulties with collision-prone switching tables are more pronounced. In a transport network, all nodes are essentially active all the time. Thus any MAC look-up collision will lead to permanent flooding of the traffic. A datacom network, on the other hand, will see this type of flooding only when two colliding MAC addresses are active at the same time. Furthermore, in a cellular network, RBSs (Radio Base Stations) are distributed over large areas and often at hard-to-reach locations. Therefore, the cost for transport link capacity is often an issue due to the use of microwave links with limited bandwidth or leased lines with high cost/capacity. This makes it desirable to keep the peak capacity low. As result, flooding will be a waste of expensive capacity. In the telecom world, equipment reliability is extremely high, and acceptance of random difficulties low. A Non-performing RBS will be detected. The operator will replace board(s), and the MTBF (Mean Time Between Failure) statistics for the RBS will be affected. Some Ethernet connections may also be throttled to a low bit-rate like 1 Mbit/s or 10 Mbit/s due to limited capacity in packet processing and/or links. This can both be node internal links, links on boards and links in the transport network. Such links will suffer from flooding by dropped packets and/or delays due to flooding packets which are intended for another destination are adding to the intended payload. Moreover, it is becoming customary to add various types of site equipment, such as site control equipment, Web cameras, Climate control equipment, or laptops (for visiting technicians), to RBS sites. Traffic load from the site equipment is generally low and will usually not be a problem if it should be flooded. However, the site equipment adds MAC addresses to the switching table, thus increasing a probability for collisions.

One way to overcome the above-described difficulties with the collision-prone switching table is to over-dimension all transport links to be able handle the worst case(s) of flooding. Although this can be feasible for some links, it will in general be too expensive when all links are considered.

Another way would be to introduce some form of advanced MAC address planning and/or detection and correction. This is feasible for a small network or a limited part of a network but will be complicated for a large network and adds to the maintenance cost.

Consequently, there is a need to overcome or at least mitigate the above-described difficulties with the collision-prone switching table in a simple and cost-effective manner.

SUMMARY

A main object of the inventions is thus to provide ways and means that allow the above-described difficulties with switching based on a collision-prone switching table to be overcome or at least mitigated.

According one aspect of the present invention, the above-stated object is achieved with a method for handling a switch with a collision-prone switching table. According to the method, it is suggested to provide a preferred destination list. This list identifies one or more preferred switching destinations. For each preferred destination, a switching address and a corresponding port identification is obtained. An order is then made to enter and lock the obtained switching address and corresponding port identification into the switching table.

Consequently, the above-indicated method provides a possibility to avoid collision-caused flooding from the switch for certain identified destination(s) (the preferred destinations). To provide this opportunity is of great value, since in many switching scenarios there are often only relatively few destinations that will cause really difficult cases of flooding in the event of collision. To remove these cases from consideration makes it possible avoid using more complex or expensive switching equipment, while still not having to worry about consequences of collision-caused flooding.

According to another aspect of the invention, the above-stated object is achieved with a switching arrangement capable of performing the above-indicated method.

One main advantage of the invention is thus that it allows for improved switching and switching equipment which are still relatively simple and cost-effective.

A person skilled in the art will appreciate that further objects and advantages may be associated with particular embodiments of the invention, as will become clear in the detailed description.

The invention will now be described further using exemplary embodiments and referring to the drawings.

DETAILED DESCRIPTION

Figure 1:
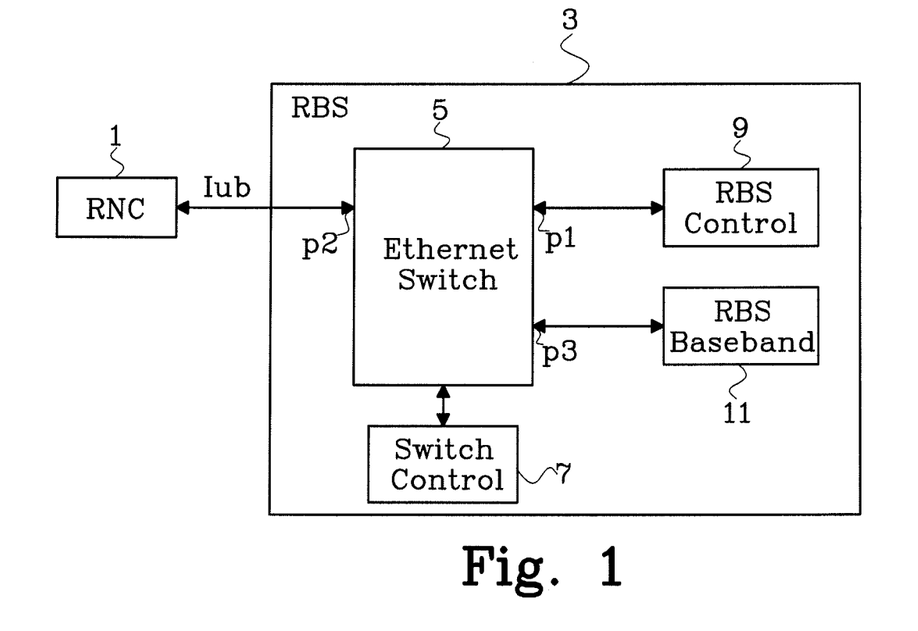
FIG. 1 is block diagram illustrating a scenario where the present invention may be applied.

FIG. 1 is a block diagram illustrating one exemplary situation to which the present invention may be advantageously applied. A control node, here an RNC 1 (Radio Network Controller) is connected to an RBS 3 via a data transport link. In this example, the RNC 1 and the RBS form part of a WCDMA system, and the connection between the RNC 1 and the RBS 3 is the so-called Iub interface. From a purely logical viewpoint, the connection is point-to-point. From a physical viewpoint, however, the connection is implementation dependent and can be based on a chain or tree structure where some RBSs serve as hubs and some RBSs constitute "leaves" in the chain or tree. When an RBS serves as a hub, it not only receives and transmits data relating to its own operation but is also responsible for forwarding data to or from one or more other RBSs. A leaf RBS does not forward data to or from other RBSs, but only receives and transmits data relating to its own operation.

The RBS 3 of FIG. 1 includes an Ethernet switch 5 with a switch controller 7. For the sake simplicity, only three ports p1-p3 of the Ethernet switch 5 are shown in FIG. 1. Of course, the Ethernet switch 5 may (and usually will) include many more ports. The port p1 is here connected to an RBS control unit 9. In this WCDMA example, the RBS control unit 9 may be a 3GPP specified Iub control plane termination; it can also be 3GPP Mub O&M (Operation and Maintenance) termination. The port p2 is connected to the RNC 1 via the Iub interface. The port p3 is connected to an RBS base band unit 11. In this WCDMA example, the RBS base band unit 11 may be a 3GPP specified Iub user plane termination.

Figure 2:
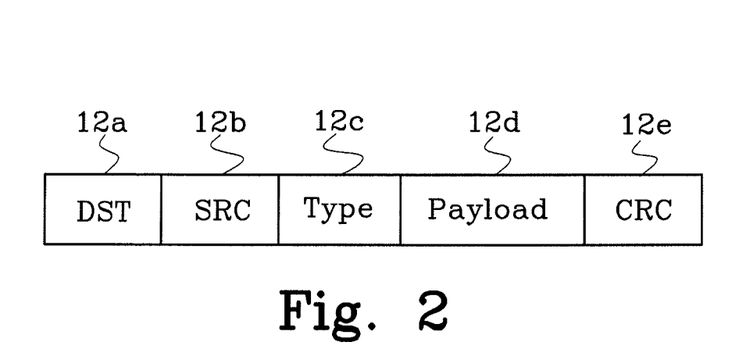
FIG. 2 is diagram illustrating a format of an Ethernet frame.

The Ethernet switch 5 is capable of switching Ethernet frames between the ports p1-p3 based on switching addresses. In Ethernet systems (48 bit) MAC addresses are used as switching addresses. An Ethernet frame structure is illustrated by a diagram in FIG. 2. The frame includes a destination MAC address 12a, a source MAC address 12b, a type indicator 12c, payload 12d and a CRC 12e (Cyclic Redundancy Check). The switching is performed using a switching table (not shown in FIG. 1). The switching table includes a number of positions, where each position includes an entry of information that indicates how switching is to be performed between the ports of the Ethernet switch 5. A typical format of an entry in the switching table is illustrated with a diagram in FIG. 3. The entry includes a MAC address 13a and an output port identifier 13b identifying an output port that is associated with the MAC address 13a. The entry also includes a lock bit 13c that can be used to lock the entry, i.e. provide an indication that the entry is not allowed to be changed. The entry further includes a recently used bit 13d indicating whether or not the entry has been used recently, and a valid bit 13e indicating whether or not the entry is valid. When the Ethernet switch 5 receives an Ethernet frame, the destination MAC address 12a is identified, and the switch controller 7 tries to find a position in switching table having an entry where the MAC address 13a corresponds to the destination MAC address 12a. If such a position can be found, the received Ethernet frame is forwarded to the output port specified by the entry at that position. In this is example, it is assumed that the switching table is collision-prone. For example, a hash function may be used to locate positions in the switching table. The hash function is formally a mapping from the set of MAC addresses to the set of positions in the switching table. However, the number of positions in the switching table is, e.g. for cost reasons, much smaller than the number of possible MAC addresses. It follows that the mapping cannot be injective, so that there are positions in the switching table that each correspond to two or more MAC addresses. The Ethernet switch 5 resorts to flooding if a destination MAC address 12a cannot not be found at the position specified by the hash function, e.g. because the entry is empty, invalid or because the entry is taken by another MAC address (collision).

Figure 3:
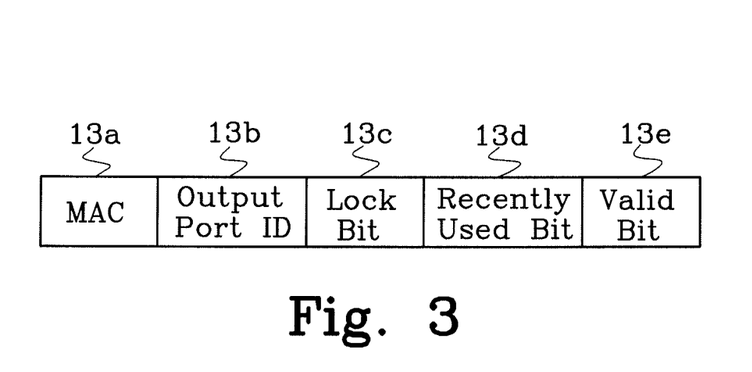
FIG. 3 is diagram illustrating a format for an entry in a switching table.

The recently used bit 13d can be used in process known as "aging", which is a form of updating of the switching table. During the aging process, each entry in the switching table is inspected in turn. If the lock bit 13c indicates that the entry under inspection is locked, no further action is performed. If the entry is not locked, it is checked whether the recently used bit 13d indicates that the entry has not been recently used, in which case the valid bit 13e is set to indicate that the entry is invalid; and the entry may then be overwritten with new information. If, on the other hand, the recently used bit 13d indicates that the entry has been recently used, the recently used bit 13d is changed to indicate that the entry has not been recently used. In this way, entries that are not frequently used can be flushed from the switching table.

In FIG. 1, the highest data rates occur on the Iub downlink, i.e. for data sent from the RNC 1 to the base band unit 11 via the Ethernet switch 5. Typical peak rates for this downlink may be around 170 Mbit/s. The data rates for the Iub uplink (base band unit 11 to RNC 1) are also fairly high. Typical peak rates for this uplink may be around 68 Mbit/s. Data rates to and from the RBS control unit 9 are, however, considerably lower, typically below 1 Mbit/s. Consequently, most Ethernet frames processed by the Ethernet switch 5 are to or from the base band unit 11. Assume that the RNC 1 has a MAC address A, that the RBS control unit 9 has a MAC address B and that the base band unit 11 has a MAC address C. Further assume that a collision exists in the switching table such that the position to which the MAC address C is allocated by the hash function is taken by some other MAC address. In this case, the Ethernet switch 5 must handle the Iub downlink by flooding on all ports except p2. This means that the RBS control unit 9 will receive a data rate that greatly exceeds what it is designed for. This might upset the proper operation of the RBS control unit 9. For example, the port p1 and/or the RBS control unit 9 may be overloaded, causing Ethernet frames actually intended for the MAC address B to be lost or delayed. A similar situation would occur if a collision existed for the MAC address A. A collision with respect to the MAC address B is, however, less severe. This may add some additional load, but this additional load is almost negligible compared the normal uplink/downlink Iub load.

According to embodiments of the invention there are provided ways and means that make it possible to avoid various problematic situations, e.g. as illustrated in FIG. 1, associated with collision-prone switching tables.

Figure 4:
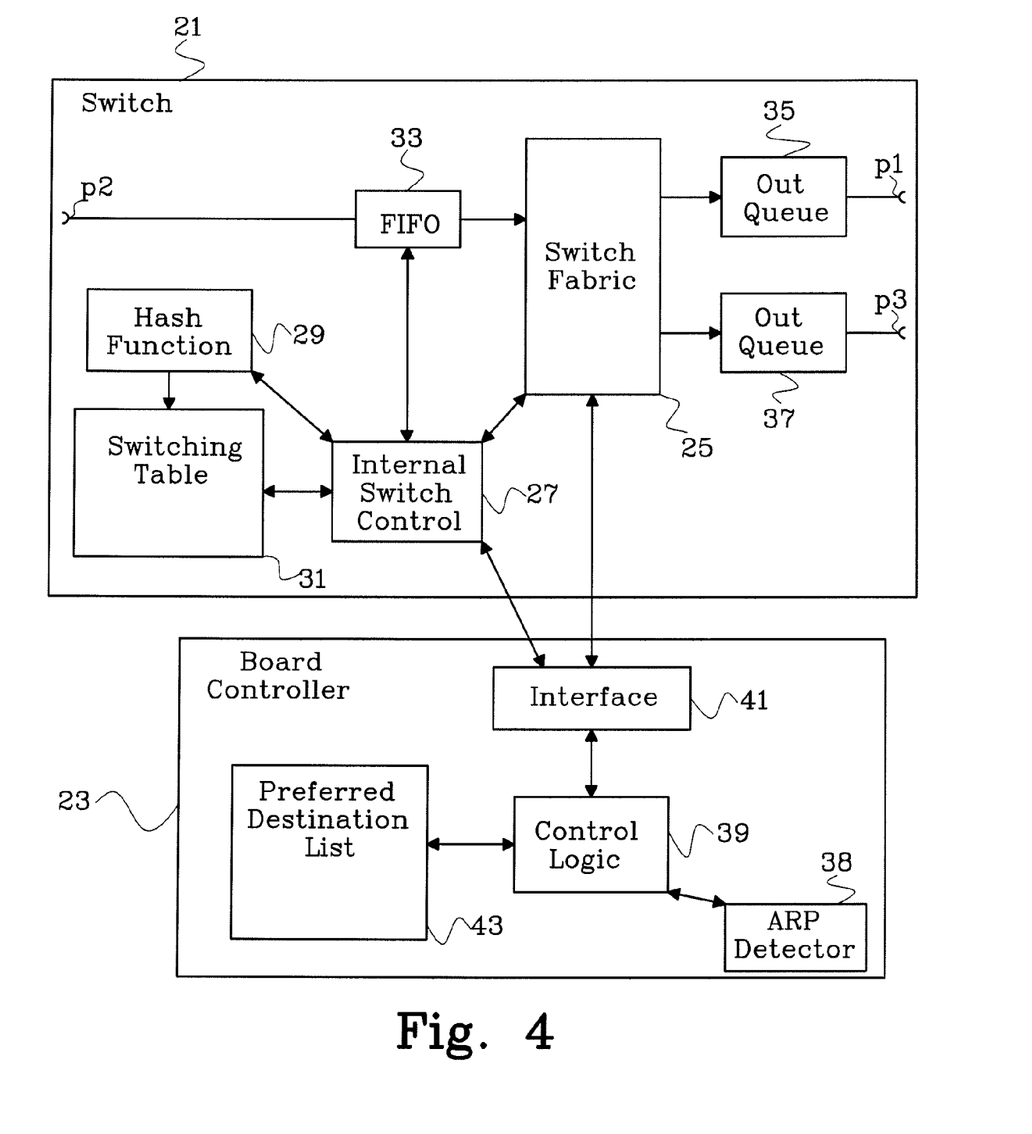
FIG. 4 is block diagram illustrating a switching arrangement according to an embodiment of the invention.

FIG. 4 is a block diagram illustrating a switching arrangement according to one embodiment of the invention. The arrangement of FIG. 4 comprises a switch 21, which may be an Ethernet switch, and an external switch controller, here in the form of a board controller 23.

The switch 21 includes a switch fabric 25, where the actual switching occurs. The switch 21 also includes an internal switch controller 27, which is connected to the switch fabric 25 as well as to other parts of the switch, as illustrated in the figure. The switching operation of the switch 21 is performed based on a collision-prone switching table 31. In this particular embodiment, a hash function calculator 29 is provided to translate switching addresses, e.g. MAC addresses, into positions of the switching table 31. An entry in the switching table 31 may, for example, be in the format indicated in FIG. 3 or similar. To avoid unnecessary detail, only three ports p1-p3 are shown in FIG. 4. The ports p1-p3 all include both an input side and an output side. However, for the sake of simplicity, only the input side of the port p2 and the output sides of the ports p1 and p3 are shown in FIG. 4. Here, the input side of the port p2 includes a FIFO (First In First Out) list, where incoming data packets, e.g. Ethernet frames, are temporarily captured so that destination and source addresses can be extracted, e.g. for switching and learning purposes. The output side of the port p1 includes an out queue 35, where outgoing data packets, e.g. Ethernet frames, are buffered awaiting transmission. The port p3 includes a corresponding out queue 37. Here, the board controller 23 also includes an ARP detector 38 connected to the control logic 39. The ARP detector may, however, be located elsewhere, e.g. in the switch 21, or incorporated in the control logic 39. An advantageous use of the ARP detector 38 will be described later on.

The board controller 23 includes control logic 39, which is responsible for the operation of the board controller. The board controller 23 further includes interface equipment 41, which connects the board controller 23 to the switch 21. In this particular embodiment, the interface equipment 41 provides connections to the internal switch controller 27 as well as to the switch fabric 25. The board controller also includes a preferred destination list 43, which has information relating to one or more preferred switching destinations. The preferred destination list 43 may be stored on an electronic storage device, e.g. a memory such as a RAM. A preferred switching destination is a destination that should take precedence over other destinations for having its switching address and corresponding port identification entered in the switching table 31. The preferred switching destinations may be those that would cause the worst cases of flooding in the case of collisions, i.e. normally those destinations that can be expected to receive the highest data rates. In a cellular or other telecom network this would normally be destinations that are responsible for receiving user plane data. For example, in the situation illustrated in FIG. 1, the RBS base band unit 11 and possibly also the RNC 1 could be indicated in the preferred destination list 43.

The preferred destination list 43 may also be located elsewhere, e.g. in the switch 21.

Figure 5A:
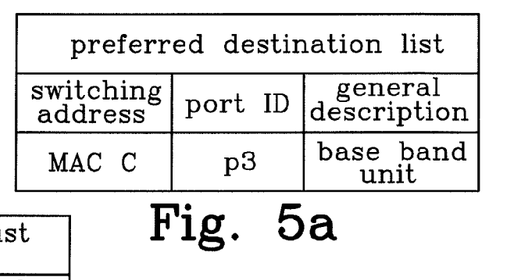
FIGS. 5a-5c are tables illustrating formats for a preferred destination list according to embodiments of the invention.

An example of a format for the preferred destination list 43 is illustrated with a table in FIG. 5a. Here, the preferred destination list includes information regarding switching address, e.g. a MAC address, and an identification of a switch port connected directly or indirectly to a preferred destination associated with the switching address. The list also includes some general description (purely optional) of each preferred destination in the list. In this particular example, only one preferred destination (the RBS base band unit of FIG. 1) is included in the list. Consequently, the preferred destination list of FIG. 5a indicates the MAC address MAC C as the switching address and the port p3 as the port that is connected to RBS baseband unit 11.

Figure 5B:
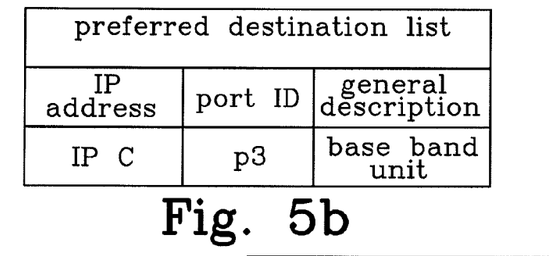

Another example format for the preferred destination list 43 is illustrated with a table in FIG. 5b. The list in FIG. 5b differs from the list of FIG. 5a in that the table includes an IP address for the preferred destination instead of the switching address (e.g MAC address). Here, the switching address (e.g. a MAC address) can be obtained from the IP address, e.g. by using conventional protocols. For example, in an Ethernet embodiment, ARP (Address Resolution Protocol) may be used to obtain the MAC address based on the IP address.

Figure 5C:
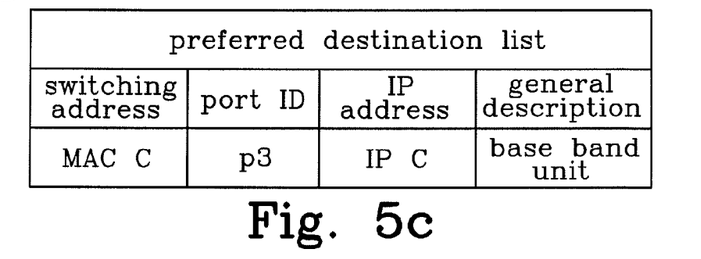

Yet another example format for the preferred destination list 43 is illustrated with a table in FIG. 5c. Here, both switching address (here MAC address) and IP address are provided in the list.

In the embodiment of FIG. 4, the switch control functionality is divided into an external control and an internal control. This division is merely exemplary, and the switch control may, for example, be completely performed within the switch 21 or be divided in some other way.

Figure 6:
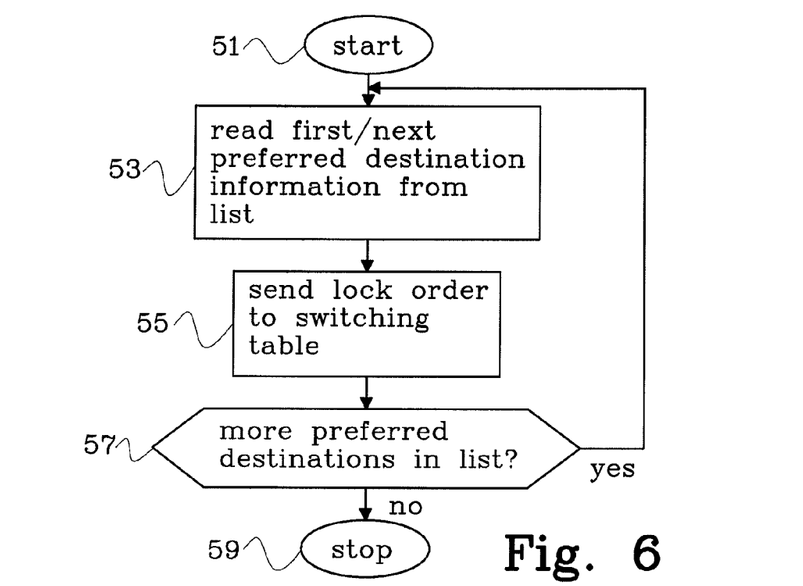
FIG. 6 is flow chart illustrating a method according to an embodiment of the invention.

FIG. 6 is a flow chart illustrating a method for handling a switch with a collision-prone switching table according to one embodiment of the invention. The method of FIG. 6 could, for example, be performed in the switching arrangement of FIG. 4.

In FIG. 6, it is assumed that a preferred destination list is provided. The preferred destination list indicates one or more preferred destinations. After a start 51, which could include the providing of the preferred destination list, information relating to a first preferred destination (e.g. the base band unit 11) is read from the preferred destination list at a block 53. The read information includes the switching address (e.g. MAC C) and the identification of the associated port (e.g. p3) to which the first preferred destination is connected. Alternatively, the switching address may be obtained based an IP address, as explained earlier. The IP address may be provided by the preferred destination list. In the embodiment of FIG. 4, the block 53 could, for example, be performed by the control logic 39 of the board controller 23. At a block 55, a lock order is sent to the switching table. The lock order informs the switching table of the switching address and the associated switch port relating to the first preferred destination. The lock order has the effect that the switching table enters the switching address and the port identification in a position, which is based on the switching address, e.g. through the use of a hash function or other look-up algorithm. The order also has the effect that the switching table locks this position, e.g. by setting a lock bit to indicate that the position is locked. This means that the entry relating to the first preferred destination may not be changed, e.g. by the aging process or otherwise. In the embodiment of FIG. 4, the lock order could, for example, be generated by the control logic 39 of the board controller 23 and transmitted to the switching table 31 via the interface equipment 41 and the internal switch controller 27. At a block 57, it is determined whether the preferred destination list includes more preferred destinations. If so, the method returns to block 53 and performs the actions of blocks 53 and 55 with respect to the next preferred destination in the list. This is continued until all preferred destinations in the list have been processed, after which the method stops at 59.

Figure 8:
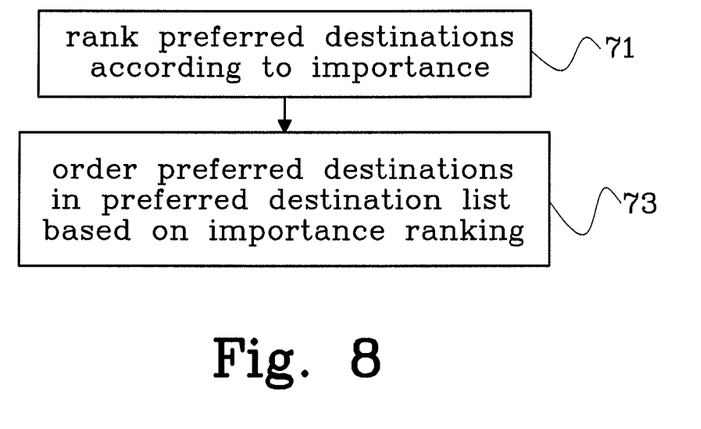
FIG. 8 is a flow chart illustrating a method according to an embodiment of the invention.

Although somewhat unlikely, it may happen that the switching addresses of two (or more) preferred destinations are associated with the same position in the switching table (collision). It is, therefore, advisable to introduce some form of importance ranking of the preferred destinations. For example, based on this ranking, the preferred destinations may be arranged so that the most important preferred destination (e.g. the worst case of flooding) is the first preferred destination in the list, any other preferred destinations being arranged in descending order of importance after the most important preferred destination. This will guarantee that a more important preferred destination always takes precedence in the switching table over a less important preferred destination. This procedure is summarized with a simple flow chart in FIG. 8. At a block 71, the preferred destinations are ranked according to importance. The preferred destinations are thereafter ordered in the preferred destination list based on the importance ranking at a block 73.

Figure 7:
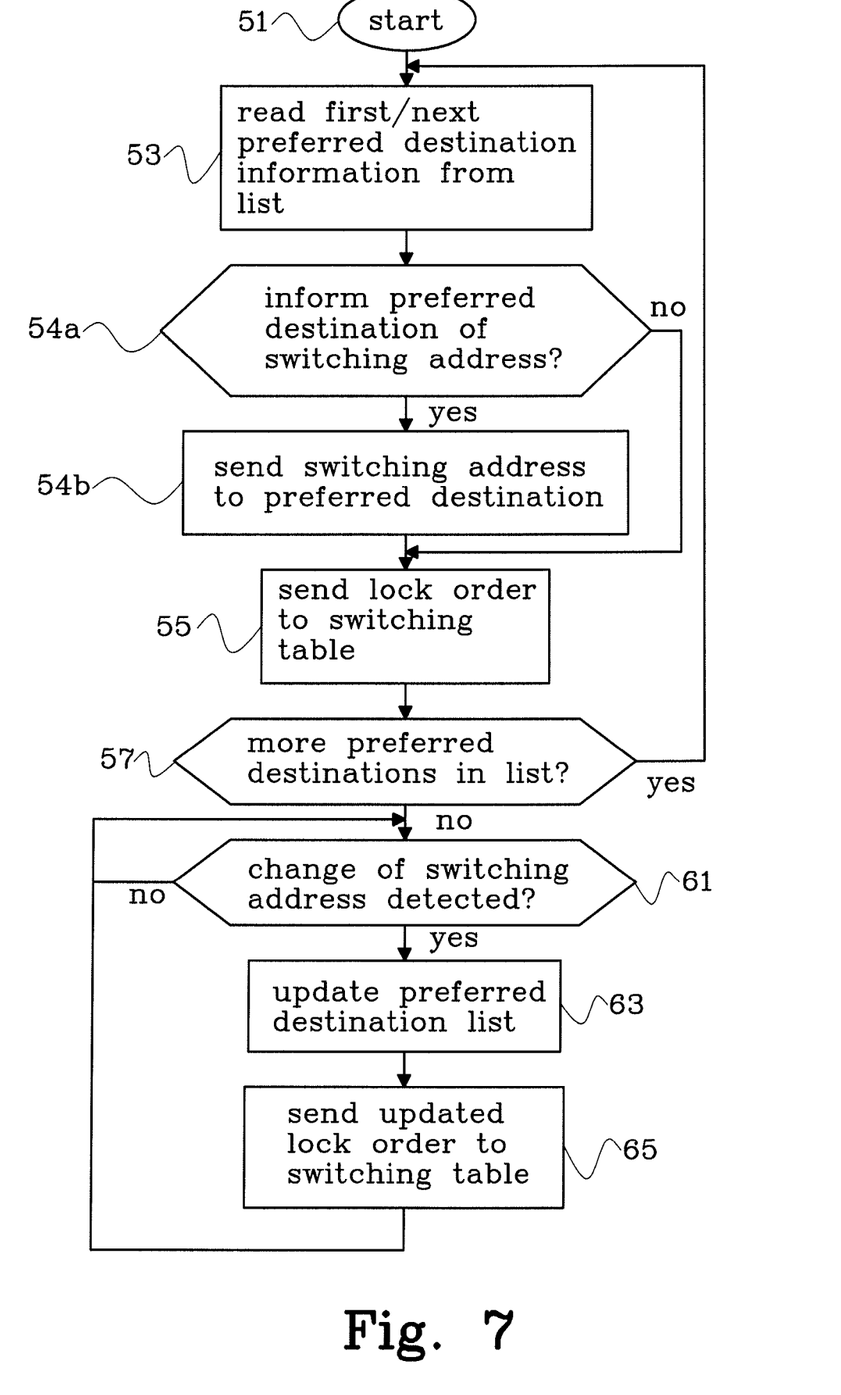
FIG. 7 is a flow chart illustrating a method according to an embodiment of the invention.

FIG. 7 is a flow chart illustrating a method for handling a switch with a collision-prone switching table according to another embodiment of the invention. The method of FIG. 7 could, for example, be performed in the switching arrangement of FIG. 4. The method of FIG. 7 has several blocks in common with the method of FIG. 6; these blocks have been given the same reference numerals as in FIG. 6 and will not be explained a second time. The method of FIG. 7 introduces two new aspects, which can be used independently of each other. First, the method takes into consideration that a preferred destination may not originally be privy to its own switching address. Second, the method takes into account that a switching address for a preferred destination may subsequently be changed. Consequently, at a block 54a, it is determined whether a preferred destination should be informed of its switching address from the preferred destination list. This may be determined from information included in the preferred destination list or from information obtained elsewhere. If it is determined that the preferred destination under consideration should be informed of the switching address, the switching address is sent to the preferred destination at a block 54b. In the embodiment of FIG. 4, the blocks 54a and 54b could, for example be performed or initiated by the control logic 39 in the board controller 23. In some types of systems, it may be possible to allocate a new switching address for a destination. Therefore, at a block 61, it is detected that a new switching address has been allocated to a destination that is in the preferred destination list. In response to the detection at the block 61, the preferred destination list is updated with the new switching address. After the preferred destination list has been updated, an updated lock order is sent to the switching table at a block 65. The updated lock order causes the switching table entry where the previous switching address is entered to be unlocked; this entry is then allowed to be overwritten and may eventually be marked as invalid by the aging process. The updated lock order also causes the new switching address and the corresponding port identification to be entered into the switching table. In a particular embodiment, the allocation of the new switching address may be detected through ARP, gratuitous ARP, or similar messages. ARP (Address Resolution Protocol) is an Ethernet protocol (specified in IETF RFC 826) used to find which MAC address to use for reaching a destination having a given IP address. Gratuitous ARP is a special case where an Ethernet node announces its IP address to inform that a new MAC address is to be used for reaching this IP address. This makes the change effective immediately, since all nodes on the Ethernet will receive the gratuitous ARP and can update a local copy of the MAC address to use for reaching the announced IP address. As mentioned above, the preferred destination list may provide at least one IP address for any preferred destination in the list, thus aiding in the detection of a new MAC address. With the particular embodiment of FIG. 4, the above-mentioned ARP based detection of the new switching address may of course be performed by the ARP detector 38.

The present invention makes it possible to provide simple and low-cost switching and switching equipment which do not suffer to any great extent from difficulties that can otherwise be associated with flooding. The invention can be applied in many systems and scenarios. For example, the invention can be advantageously applied in cellular and other telecom oriented networks. In particular, the invention can be used to avoid flooding from destinations that receive high data rates, e.g. destinations that are responsible for receiving user plane data.

VLAN (Virtual LAN) systems constitute another application for the invention. VLAN is an add-on to the Ethernet standard where a VLAN identity tag is added to each Ethernet frame. This makes it possible for one physical Ethernet switch to act as up to 4096 virtual switches. An operator can, therefore, run up to 4096 logically independent networks on one physical network. Flooding effects will be mitigated since flooding will stay within one VLAN. However, the risk of collision will generally increase since all VLANs share the same physical switching table.

Above, the invention has been described using various embodiments. The described and indicated embodiments are, however, intended only as non-limiting examples. Instead, the scope of protection is defined by the appending claims.

The invention claimed is:

1. A method for handling a switch with a collision-prone switching table, the method comprising:
   providing a preferred destination list indentifying one or more preferred switching destinations; and
   for each preferred destination in the preferred destination list:
      obtaining a switching address and a corresponding switching port identification for the preferred switching destination; and
      ordering the obtained switching address and the corresponding switching port identification to be entered and locked into the collision-prone switching table.

2. The method according to claim 1, wherein the switch is connected to one or more destinations in a radio base station for a cellular communication system.

3. The method according to claim 2, wherein providing the preferred destination list comprises providing a preferred destination list that indicates at least one destination in the radio base station as a preferred switching destination.

4. The method according to claim 3, wherein the indicated at least one preferred destination in the radio base station comprises a destination that is responsible for receiving user plane data.

5. The method according claim 4, wherein the user plane data emanates from a network control node.

6. The method according to claim 1, wherein ordering the obtained switching address and the corresponding switching port identification to be entered and locked into the collision-prone switching table comprises obtaining the switching address and the corresponding switching port identification from the preferred destination list.

7. The method according to claim 1, wherein the preferred destination list comprises an IP address for a preferred switching destination in the preferred destination list, and wherein obtaining the switching address and the corresponding switching port identification for the preferred switching destination comprises using the IP address for obtaining the switching address of the preferred switching destination having that IP address.

8. The method according to claim 1, wherein the method further comprises informing at least one preferred switching destination indicated in the preferred destination list of its switching address.

9. The method according to claim 1, wherein the method further comprises:
   detecting that a new switching address has been allocated to a switching destination indicated in the preferred destination list; and
   updating the preferred destination list and the collision-prone switching table based on the new switching address.

10. The method according to claim 1, wherein the method further comprises providing an importance ranking of the one or more preferred switching destinations.

11. The method according to claim 10, wherein the one or more preferred switching destinations are ordered in the preferred destination list based on the importance ranking.

12. A switching arrangement comprising:
   a switch with a collision-prone switching table;
   a preferred destination list identifying one or more preferred switching destinations; and
   a controller configured to obtain for each preferred switching destination in the preferred destination list a switching address and a corresponding switching port identification and to generate an order to enter and lock the obtained switching address and corresponding switching port identification into the collision-prone switching table.

13. The switching arrangement according to claim 12, wherein the switch is capable of being connected to one or more destinations in a radio base station for a cellular communication system.

14. The switching arrangement according to claim 13, wherein the preferred destination list indicates at least one destination in the radio base station as a preferred switching destination.

15. The switching arrangement according to claim 14, wherein the indicated at least one preferred switching destination in the radio base station comprises a destination that is responsible for receiving user plane data.

16. The switching arrangement according to claim 15, wherein the switch is capable of being connected to a control node transmitting the user plane data.

17. The switching arrangement according to claim 12, wherein the controller is configured to obtain the switching address and the corresponding switching port identification from the preferred destination list (43).

18. The switching arrangement according to claim 12, wherein the preferred destination list comprises an IP address for a preferred switching destination in the list, and wherein the controller is configured to use the IP address to obtain the switching address for the preferred switching destination having that IP address.

19. The switching arrangement according to claim 12, wherein the controller is configured to inform at least one preferred switching destination indicated in the preferred destination list of the switching address obtained by the controller.

20. The switching arrangement according to claim 12, wherein:
   the switching arrangement further comprises a detector configured to detect that a new switching address has been allocated to a preferred switching destination indicated in the preferred destination list; and wherein
   the controller is configured to initiate updating of the preferred destination list and the collision-prone switching table based on the new switching address.

21. The switching arrangement according to claim 12, wherein the one or more preferred switching destinations are ordered in the preferred destination list based on an importance ranking.

22. The method according to claim 1, wherein the collision-prone switching table stores destination addresses at positions within the table, wherein more than one destination address can be mapped to a same position in the table.

23. The method according to claim 22, wherein positions in the collision-prone switching table are associated with destination addresses by hashing and/or truncation look-up.

24. The switching arrangement according to claim 12, wherein the collision-prone switching table stores destination addresses at positions within the table, wherein more than one destination address can be mapped to a same position in the table.

25. The switching arrangement of claim 24, wherein positions in the collision-prone switching table are associated with destination addresses by hashing and/or truncation look-up.

* * * * *